United States Patent [19]

Nishimura et al.

[11] Patent Number: 5,348,142
[45] Date of Patent: Sep. 20, 1994

[54] ADJUSTABLE PALLET

[75] Inventors: Masaaki Nishimura; Takahashi Ochiyama, both of Kanagawa, Japan

[73] Assignee: Odawara Engineering Co., Ltd., Kanagawa, Japan

[21] Appl. No.: 97,446

[22] Filed: Jul. 26, 1993

[51] Int. Cl.5 .............................................. B65G 47/00
[52] U.S. Cl. ........................... 198/803.01; 198/803.11
[58] Field of Search ............... 198/345.1, 345.3, 465.1, 198/465.2, 465.3, 803.01, 803.11, 803.14; 29/33 P

[56] References Cited

U.S. PATENT DOCUMENTS

| | | |
|---|---|---|
| 140,404 | 7/1873 | Coe . |
| 957,721 | 5/1910 | Troup . |
| 1,403,997 | 1/1922 | Aeschbach . |
| 3,222,055 | 12/1965 | Cook ................................. 269/219 |
| 3,580,459 | 5/1971 | Gage et al. ............................. 228/2 |
| 3,880,074 | 4/1975 | Seifert ................................. 101/38 |
| 4,002,328 | 1/1977 | Wolf et al. ............................ 269/97 |
| 4,492,301 | 1/1985 | Inaba et al. .......................... 198/472 |
| 4,557,371 | 12/1985 | Yonezawa ....................... 198/803.01 |
| 4,667,804 | 5/1987 | Dubuit et al. ........................ 198/345 |
| 4,787,505 | 11/1988 | Tweedy .................... 198/803.11 X |
| 4,803,882 | 2/1989 | Schonfeld et al. ..................... 73/462 |
| 4,946,021 | 8/1990 | Murphy .................... 198/803.01 X |
| 4,965,924 | 10/1990 | Santandrea et al. ....... 198/803.01 X |
| 5,060,780 | 10/1991 | Santandrea et al. ....... 198/803.01 X |
| 5,060,781 | 10/1991 | Santandrea et al. ........... 198/345.1 |
| 5,092,454 | 3/1992 | Carlson ........................ 198/803.01 |
| 5,099,978 | 3/1992 | Santandrea et al. ............. 198/345.1 |
| 5,115,901 | 5/1992 | Santandrea et al. ....... 198/803.01 X |
| 5,244,082 | 9/1993 | Togashi ..................... 198/803.11 X |

Primary Examiner—D. Glenn Dayoan
Attorney, Agent, or Firm—Thompson, Hine and Flory

[57] ABSTRACT

A method and apparatus is provided for adjusting a pallet for supporting workpieces, the pallet having a pair of spaced workpiece support blocks, one of which is rotatable and presents a plurality of support surfaces. Each of the support surfaces having a different depth such that by rotation of the rotatable block with respect to the other, workpieces of differing lengths can be adjustably supported on the pallet between the blocks.

17 Claims, 4 Drawing Sheets

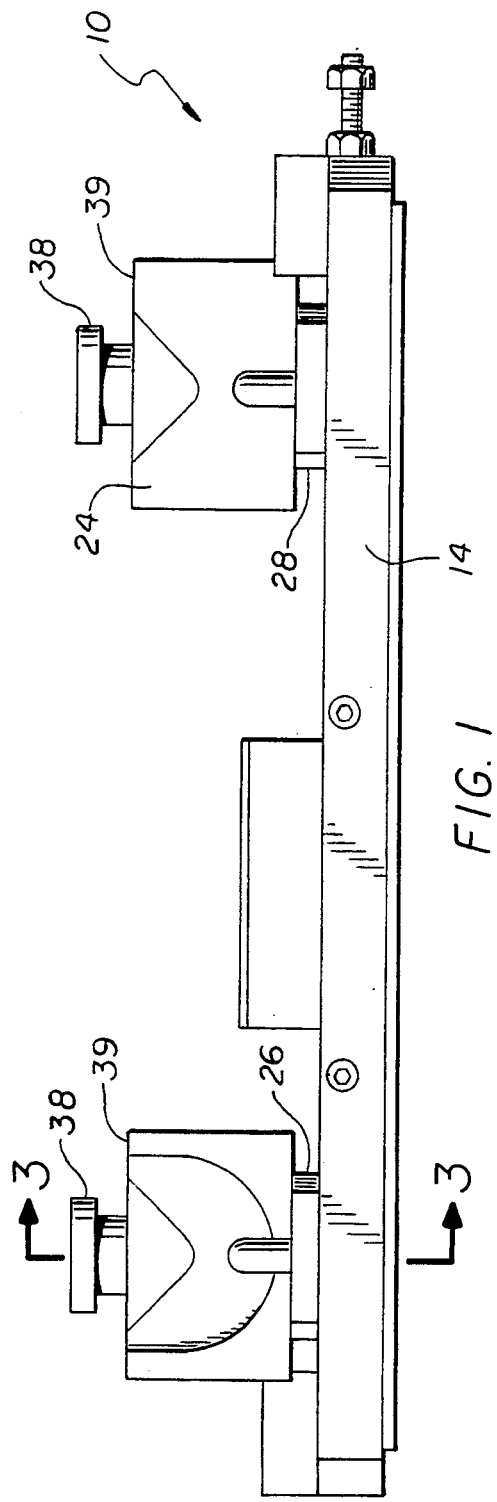
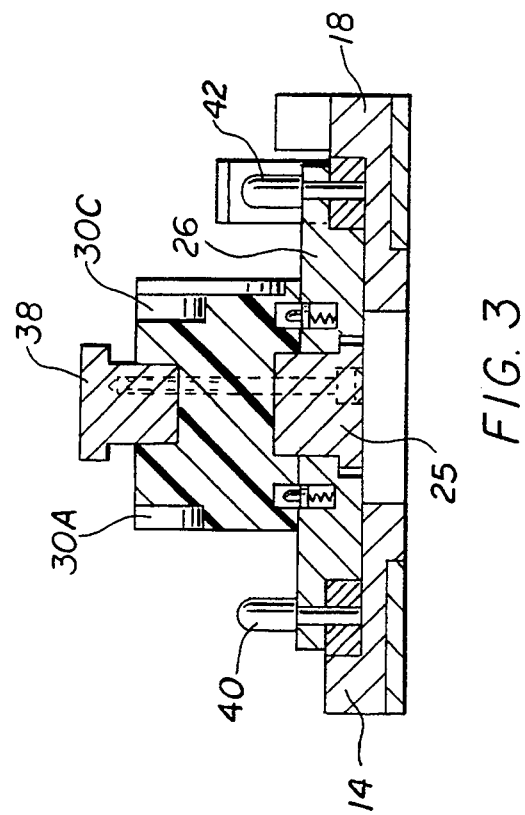

ADJUSTABLE PALLET

FIELD OF THE INVENTION

The present invention relates to an adjustable apparatus for supporting work pieces in an automated assembly line production technique.

BACKGROUND

Apparatuses for supporting work pieces in automated assembly line production techniques are known in the art. These apparatuses are described in U.S. Pat. Nos. 4,787,505; 4,492,301; 5,060,780; 5,099,978; and 5,115,901.

Pallet conveyor systems are commonly used in automated assembly lines. A work piece that is to be assembled, machined or operated on rests on the support blocks which are mounted on the pallet. The pallets act as both a support for the part to be assembled and also as a method for transporting the part from one assembly station to the next. To move from one assembly station to the next, a conveyor system transports the pallet and the part along the assembly line where each workstation performs a specific operation on the part. These processes typically use a plurality of pallets and workstations.

In one common system, a belt conveyor frictionally drives the pallet from one assembly station to the next. When the pallet arrives at a work station, the pallet is stopped and the workstation begins its operation. To work on the part, the work station either removes the part from the pallet, works on the part as it rests on the pallet or removes the entire pallet from the conveyor to perform its work operations. When the work station concludes its operations, the part is returned to the pallet and the pallet is released to continue down the assembly line, or the entire pallet is replaced on the conveyor to continue down the assembly line.

SUMMARY OF THE INVENTION

The present invention is directed to an adjustable pallet having a pair of work piece support blocks at least one of which is rotationally adjustable to accommodate work pieces of differing sizes. In accordance with a preferred embodiment, both support blocks are rotatably and translationally adjustable with respect to each other. Each work piece support block, with respect to the other, has a plurality of faces, and each face includes within it a work piece support surface of a different depth. By placing the blocks at different locations on the pallet and rotating the work piece support blocks to present different faces at the center of the pallet work pieces of different sizes can be accommodated. In one embodiment, an automatic positioning means translationally and rotationally adjusts the work piece support blocks. The positioning means grasps each work piece support block, removes it from a first position on the pallet, selects the appropriate face of the block to accommodate the size of the workpiece, rotates the block such that the appropriate face faces on the center of the pallet, and repositions the block at the same or a second location on the pallet to accommodate the new work piece.

One manifestation of the invention is an adjustable pallet for supporting work pieces of differing sizes. This comprises a pallet with a pair of work piece support blocks at least one of which is rotatably mounted on the pallet. The rotatable work piece support block(s) present a plurality of support surfaces with each surface having a different depth. When one work piece support block is translated and/or rotated in respect to the other, the pallet can adjustably support work pieces of differing sizes between the work piece support blocks.

Another manifestation of the invention is a method for adjusting a pallet to accommodate work pieces of differing sizes. The method comprises providing a pallet having a pair of spaced work piece support blocks mounted on the pallet, at least one of which is rotatable with respect to the other, and the rotatable work piece support block presenting a plurality of support surfaces each of the surfaces being of a different depth such that by rotation of one of the rotatable work piece support block, work pieces of differing lengths can be adjustably supported on the pallet between the work piece support blocks. The location and rotational orientation of the rotatable work piece support block is determine, and the rotatable work piece support block is rotated to place a different support surface in position to receive a work piece.

BRIEF DESCRIPTION OF THE DRAWINGS

The above and other objects and advantages of the invention will be apparent upon consideration of the following detailed description, taken in conjunction with the accompanying drawings, in which like reference characters refer to like parts, and in which:

FIG. 1 is a side view of an adjustable pallet in accordance with one embodiment of the invention;

FIG. 3 is a cross-sectional view of a work piece support block along the line 3—3 in FIG. 2;

DETAILED DESCRIPTION OF THE INVENTION

Figure 2:
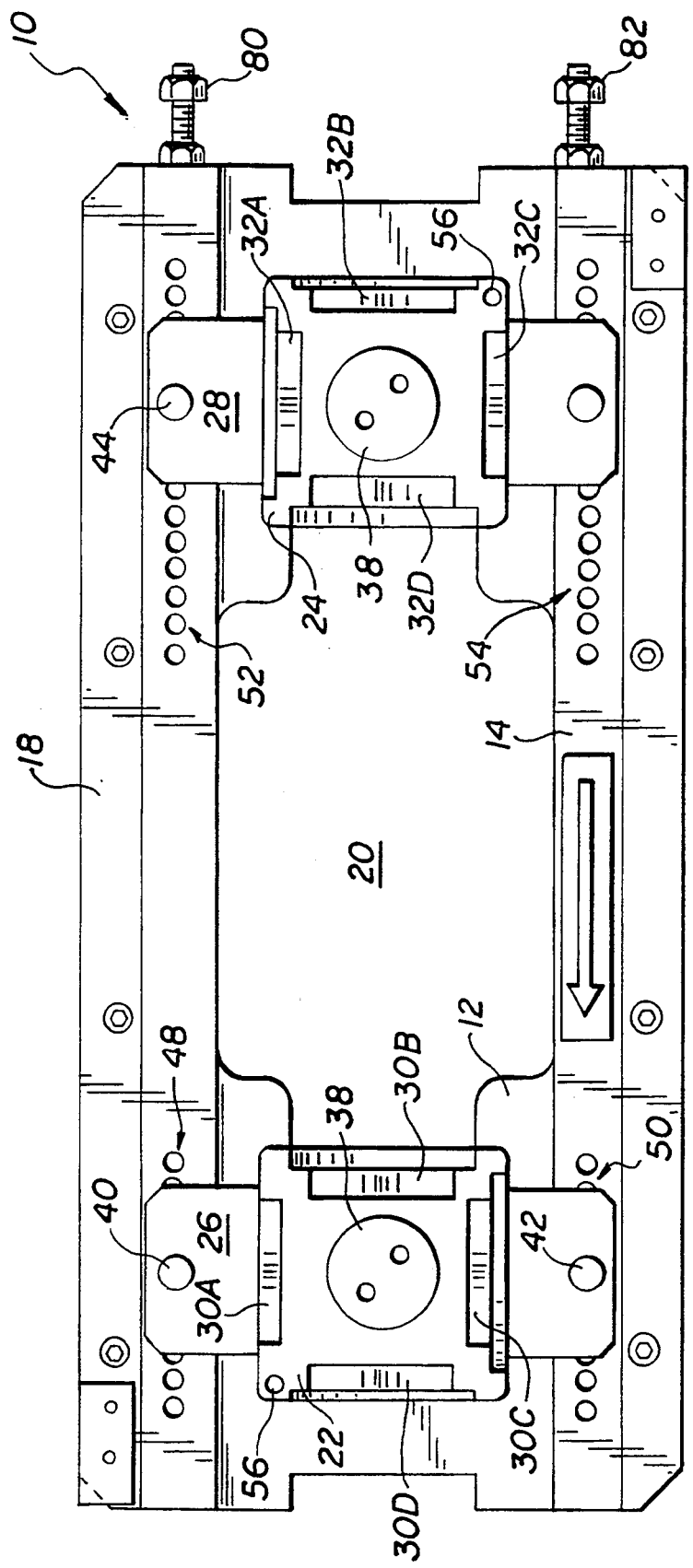
FIG. 2 is a top view of the pallet of FIG. 1.

An adjustable pallet 10 in accordance with one embodiment of the invention is shown in FIGS. 1 and 2 and includes four frame members 12, 14, 16, and 18. These four frame members define a rectangular shaped pallet 10 having an aperture 20 at its center. A first work piece support block 22 and a second work piece support block 24 are rotationally mounted on a hub 25 on first bridging element 26 and a hub (not shown) on second bridging element 28 which bridge aperture 20 in the pallet 10. The first bridging element includes a first pair of pins 40 and 42 and the second bridging element 28 includes a second pair of pins 44 and 46. The first set of pins 40 and 42 engage the first set of holes 48 and 50, respectively, in the frame and the second set of pins 44 and 46 engage a second set of holes 52 and 54, respectively, in the frame. Each work piece support block includes an actuator 38 located on the top surface 39 of the cube. As shown in FIG. 3, to secure the angular position of the blocks, each block has on its bottom surface "V" shaped recesses 58 and 60 which cooperate with spring biased securing pins 62 and 64, respectively. Two of the recesses are shown in FIG. 3 and two are not. The pallet is equipped with two adjustable extensions 80 and 82 which can be shortened or lengthened to adjust the position of the palet in the work station.

Each block 22 and 24 further includes four support surfaces 30a, 30b, 30c and 30d and 32a, 32b, 32c and 32d on each of its faces as a, b, c and d as hereafter referenced, which can accommodate work pieces of differing sizes by having different combinations of support surfaces face the center of the pallet 10 and different locations. In the embodiment illustrated support surfaces, 30a and 32a are 1.5 mm deep, support surfaces 30b and 32b are 3.0 mm deep, support surfaces 30c and 32c are 4.5 mm deep, and support surfaces 30d and 32d are 6 mm deep. Other support surface depths can also be used and it is not necessary that the work support surface depths be the same in each block. Also with the invention is illustrated for block shaving four faces, it will be apparent that blocks having 3, 5 or more faces could also be used. In the preferred embodiment, these support surfaces are "V" shaped. The blocks 22 and 24 also include locating pins 56 positioned on one corner of the top surface 39 which is sensed by a proximity switch in the automatic positioning unit as described later.

The distance between the blocks 22 and 24 can be adjusted to accommodate work pieces of differing sizes by moving the bridges laterally in hole sets 48 and 50 and 52 and 54 in the pallet and rotating the blocks such that a different support surface faces the center line 20 of the pallet 10. This can be accomplished by removing the block and bridging element and its associated pins from their respective holes in the pallet and repositioning the block and bridging element at another location on the pallet 10 and by rotating the blocks. This invention is open to an embodiment where one of the work piece support blocks is fixed and one is rotatable, as well as to an embodiment in which one is fixed and the other is rotatable and translatable, and to an embodiment in which both blocks are rotatable and translatable. When both blocks are rotatable and translatable, the center of a work piece can be maintained over the center of the pallet. As a result, the location at which the part or work piece is mounted and grasped in the work station will be consistent.

Figure 4:
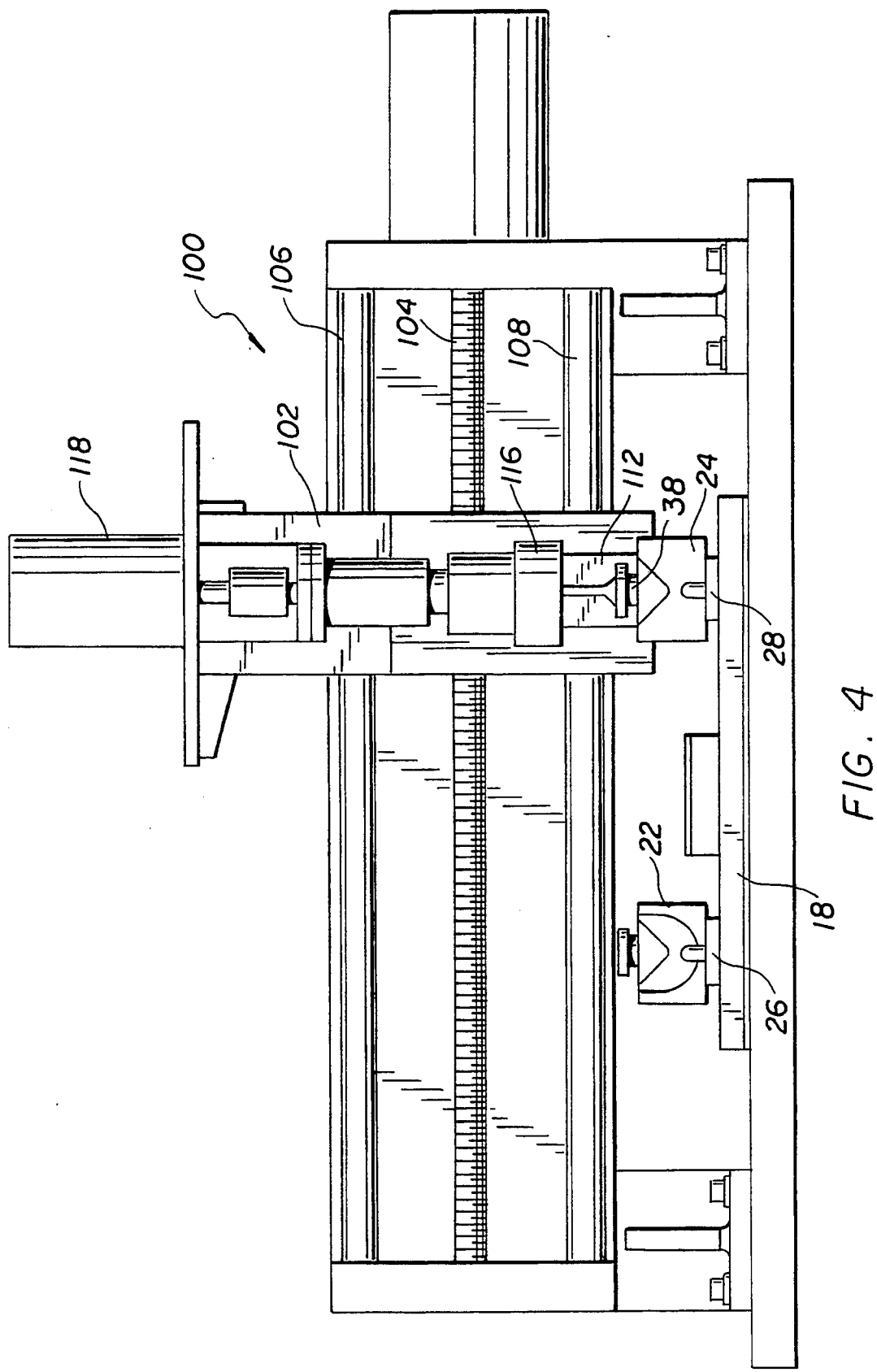
FIG. 4 is a front view of an automatic positioning means.
Figure 5:
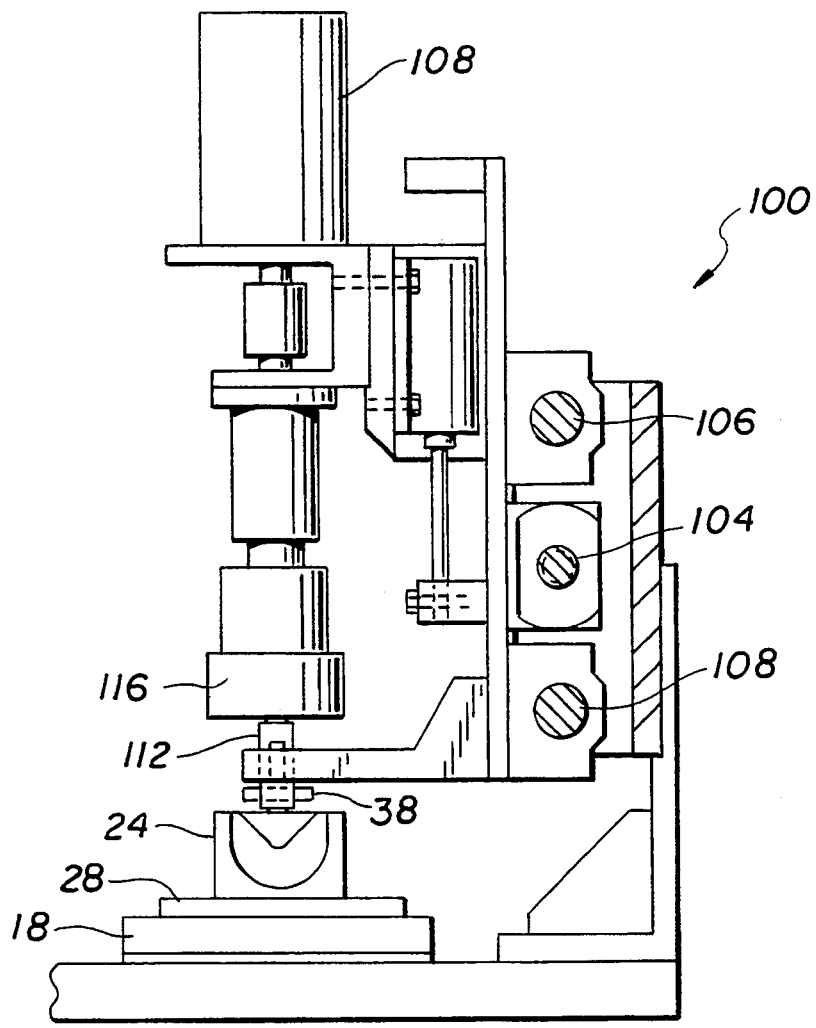
FIG. 5 represents a side view of the automatic positioning means.

FIGS. 4 and 5 show an automatic positioning unit 100. The positioning unit 100 includes a carriage 102 which is mounted on two guide bars 106 and 108 and a ball screw 104. It includes an up-down pneumatic cylinder 124 having a pneumatic chuck 116 at one end. The pneumatic chuck 116 has jaw members 112 which grasp the actuator knob 38 of the block 24. Positioned at 90° intervals around the chuck 116 are four proximity switches which are not shown. The carriage 102 includes a retaining stage 114 for receiving the work support block 22 and bridge element 28 for adjustment. In the stage 114 clock 22 can be rotated relative to the bridge 28. The unit 100 also includes a motor 118 for rotational movement of the chuck and a servo motor 110 for rotation of ball screw 104 and lateral movement of the carriage 102.

To move the carriage 102 into position over the work piece support block 22, the servo motor 110 rotates the ball screw 104 to position the carriage 102 over the desired block. Servo motor 110 is controlled by an appropriate control module which locates the blocks in the pallet. Once the carriage 102 is located over the work piece support block 22, a pneumatic cylinder 124 lowers the pneumatic chuck 116 over the actuator 38. The pneumatic chuck 116 is activated which causes jaw members 112 to grasp the work piece support block by the actuator 38. The cylinder 124 is activated to lift the work support block 22 into position within the carriage 102. The stage 114 secures the bridging element 26 such that the block 22 can be rotated with regard to the bridge 26. Once the block is in position in the stage carriage 102, one of the four proximity switches determines the location of the locator pin 56. When one of the proximity switches locates the pin 56, the position of the work piece support block surface with respect to the pallet is determined.

In FIG. 2, each face of the block is labeled a, b, c or d each of which corresponds to a support surface of a different depth. For example, if the pin is located on the right side of face a then the positioning unit knows that face d is directly opposite face a and to get face d into position, it must turn the cube 180 degrees. The actuator 38 can be grasped and a torque can be applied to the block by the motor 118. The torque must be sufficient to overcome the resisting force of the spring biased securing pins 62 and 64 which engage the V-shaped recesses 58 and 60 in the base of the block. This then allows the block 22 to be adjusted from a first rotational position to a second. The positioning unit 100 performs four functions in the positioning process. The first step is to remove the work piece support block from the pallet. The second step is the translational movement of the work piece support block along the holes in the frame. While performing the second step, the positioning unit simultaneously rotates the work piece support block into the selected angular position. The fourth step involves replacing the work piece support block upon the pallet in the appropriate lateral location.

Once one of the work piece support blocks is placed in the desired position, the positioning unit 100 performs the same or a similar operation on the second work piece support block 24. To come into a position where it can engage the second work piece support block 24, the servo motor 110 moves the carriage 102 horizontally along the ball screw 104 and parallel guide bars 106 and 108 until the carriage is located over the top of the second work piece support block 24.

While the description speaks in terms of rotation and translation of the work piece support blocks, one skilled in the art will recognize that the translational step may not be necessary. In those situations, the blocks may be mounted such that only rotational movement is allowed.

Having described the invention in detail, it will be apparent that numerous variations and modifications are possible without departing from the spirit and scope of the invention as defined by the following claims.

We claim:

1. An adjustable pallet for supporting work pieces comprising:
   a pallet;
   a pair of spaced work piece support blocks mounted on said pallet, at least one of said blocks being rotatable; and
   the rotatable block presenting a plurality of support surfaces each of the surfaces being of a different depth such that by rotation of the rotatable block with respect to the other, work pieces of differing lengths can be adjustably supported on the pallet between the blocks.

2. The adjustable pallet of claim 1 wherein at least one of said work piece support blocks is removable from said pallet such that one of said blocks can be moved laterally with respect to the other block.

3. The adjustable pallet of claim 2 wherein the a plurality of holes is provided in the pallet and the removable work piece support block includes pins which are received in the holes in the pallet.

4. The adjustable pallet of claim 1 wherein the rotatable block includes a member engagable by an automatic adjustment means for adjusting the angular position of said rotatable block.

5. The apparatus of claim 4 wherein the rotatable block includes a means for indicating the angular position of the block.

6. The apparatus of claim 1 wherein the rotatable block has four vertical support surfaces.

7. The adjustable pallet of claim 1 wherein the rotatable block includes means to hold the block in a predetermined angular position.

8. The adjustable pallet of claim 1 wherein both of the blocks are rotatable.

9. A method for adjusting an adjustable pallet for work pieces comprising:
   (a) providing an adjustable pallet comprising
      a pallet;
      a pair of spaced work piece support blocks mounted on said pallet, at least one of said blocks being rotatable; and
      the rotatable block presenting a plurality of support surfaces each of the surfaces being of a different depth such that by rotation of the rotatable block with respect to the other, work pieces of differing lengths can be adjustably supported on the pallet between the blocks;
   (b) determining the orientation of the rotatable block; and
   (c) rotating the rotatable block to place a different support surface in position to receive a work piece.

10. The method of claim 9 wherein both of the work piece support blocks are rotatable.

11. The method of claim 10 wherein the method comprises the additional steps of removing the rotatable block from the pallet and repositioning it on the pallet after rotating the block.

12. A production line for work pieces having differing dimensions, including an adjustable pallet having a pallet, a pair of spaced work piece support blocks, at least one of which is rotatable, and the rotatable block presenting a plurality of support surfaces each of the support surfaces being of a different depth such that by rotation of the rotatable block in respect to the other block, work pieces of differing lengths can be adjustably supported on the pallet between the blocks; and a positioning unit having a means for rotating the rotatable block and a means for translationally moving the rotatable block to support a selected work piece comprising the steps of:
   (a) providing a selected work piece to be carried by the pallet;
   (b) moving the pallet into position with the positioning unit so that the means for contacting the rotatable work piece support block will contact the rotatable work piece support block;
   (c) actuating the means for contacting the rotatable work piece support block to contact the rotatable work piece support block;
   (d) actuating the means for rotating the rotatable work piece support block; and
   (e) rotating the rotatable work piece support block into the desired position.

13. The method of claim 12 further comprising the steps of:
   (a) actuating the means for translating the rotatable work piece support block; and
   (b) translating the rotatable work piece support block into a desired position on the pallet.

14. The method according to claim 13 wherein both of the work piece support blocks are rotatable and translatable.

15. The method according to claim 14 wherein the means for rotating the rotatable work piece support block surface from a first angular position to a second angular position.

16. The method according to claim 14 wherein both work piece support blocks include a member engagable by the means for rotating the rotatable work piece support blocks.

17. The method according to claim 14 wherein the automatic positioning unit determines the relation of the work piece support blocks to each other.

* * * * *